United States Patent [19]

Adams et al.

[11] 4,306,999

[45] Dec. 22, 1981

[54] HIGH SOLIDS, LOW VISCOSITY LIGNIN SOLUTIONS

[75] Inventors: James W. Adams, Schofield; Michael W. Schoenherr, Wausau, both of Wis.

[73] Assignee: American Can Company, Greenwich, Conn.

[21] Appl. No.: 97,052

[22] Filed: Nov. 23, 1979

[51] Int. Cl.$^3$ .......................... C08G 8/28; C08H 5/02
[52] U.S. Cl. .................................... 260/17.5; 252/182
[58] Field of Search ....................... 260/17.5; 252/182

[56] References Cited

U.S. PATENT DOCUMENTS

| | | | |
|---|---|---|---|
| 2,168,160 | 8/1939 | Hochwalt et al. | 260/17.5 |
| 2,221,282 | 11/1940 | Champer et al. | 260/47 |
| 2,221,778 | 11/1940 | Collings et al. | 260/17.5 |
| 2,282,518 | 5/1942 | Hochwalt et al. | 260/17.5 |
| 3,216,839 | 11/1965 | Webster | 106/123 |
| 3,223,647 | 12/1965 | Ball et al. | 260/124 |
| 3,454,508 | 7/1969 | Herrick et al. | 260/17.5 |
| 3,864,291 | 2/1975 | Enkvist | 260/17.5 |

*Primary Examiner*—Earl A. Nielsen

*Attorney, Agent, or Firm*—Robert P. Auber; Ira S. Dorman; Ernestine C. Bartlett

[57] ABSTRACT

Lignin concentrate solutions with at least about 40% total solids, having viscosities not higher than 10,000 cps. at 25° C. and comprising normally water-insoluble and phenol-insoluble Kraft lignin dissolved in solvents comprising phenol and water or phenol-water-sodium hydroxide or ammonia are provided. The concentrates contain lignin to phenol weight ratios of less than 70:30 and more than 40:60 and preferably 50:50, and optionally, 2 to 20%, based on the weight of lignin, of sodium hydroxide or ammonia.

The concentrates are storable and suitable for shipment and may be employed as phenol extenders in applications normally using phenols. They are particularly tailored for use in replacement of 25% to 100% of the phenol component in the production of phenol/formaldehyde resins and, when so employed, provide phenol-lignin-formaldehyde (PLF) resins that are useful in the formulation of plywood adhesives.

16 Claims, 3 Drawing Figures

HIGH SOLIDS, LOW VISCOSITY LIGNIN SOLUTIONS

BACKGROUND OF THE INVENTION

1. Prior Art

The prior art is believed to be best exemplified by the following patents and literature references:

| Hochwalt et al | 2,168,160 | 8/39 |
| Hochwalt et al | 2,282,518 | 5/42 |
| Ball et al | 2,997,466 | 8/61 |
| Webster | 3,216,839 | 11/65 |
| Ball et al | 3,048,576 | 8/62 |
| Ball et al | 3,223,697 | 12/65 |
| Herrick et al | 3,454,508 | 7/69 |
| Enkvist | 3,864,291 | 2/75 |
| Johansson | 4,113,542 | 9/78 |

Merewether, "The Precipitation of Lignin from Eucalyptus Kraft Black Liquors", *TAPPI*, Vol. 45, No. 2, pp. 159–163, February, 1962.

Dolenko et al, "Resin binders from Kraft Lignin", *Forest Products Journal*, Vol. 28, No. 8, pp. 41–46, August, 1978.

Forss et al, "Finnish Plywood, Particleboard, and Fiberboard Made With A Lignin-Base Adhesive", *Forest Products Journal*, Vol. 29, No. 7, pp. 39–43, July, 1979.

2. Field of the Invention

This invention is related to lignin and lignin products derived from black liquor.

Lignin is derived from wood as a by-product in the pulping process and as an abundant, natural and renewable product, has tremendous potential for many industrial uses as replacements for increasingly scarce and expensive petroleum based materials. Lignin has found limited utilization commercially, however, because it is complex chemically and physically and its characteristics have been found to vary considerably, depending on many factors including variations in pulping conditions, the kind of wood being pulped, the conditions under which it is recovered, etc.

It is known that lignin obtained as a by-product in alkaline pulping processes contains both aliphatic and aromatic hydroxyl groups which are attractive sites for chemical modifications. Because of the similarity of the hypothesized chemical structure of alkali lignin to phenolic resins, lignin has been proposed as a replacement for phenol in resins.

One such technological area where replacement of phenol by lignin has been suggested is in the plywood industry where lignin has been proposed as at least a partial substitute for expensive petrochemicals such as phenol in phenol-formaldehyde resins employed as adhesives. Such resins, commonly designated P/F resins, are made by condensing phenol with formaldehyde in water using sodium hydroxide catalyst to make at least 35% to 45% solids resin solutions.

Various workers in the art have proposed various means for employing lignin products as substitutes or extenders for phenolic reactants. For example, Dolenko et al, "Resin Binders From Kraft Lignin", *Forest Products Journal*, Vol. 28, No. 8, pp. 41–46, August, 1978; Johansson, U.S. Pat. No. 4,113,542; Forss et al, "Finnish Plywood, Particleboard and Fiberboard Made With A Lignin-Base Adhesive", *Forest Products Journal*, Vol. 29, no. 7, pp. 39–43, July, 1979; Hochwalt et al, U.S. Pat. Nos. 2,168,160 and 2,282,518 are each directed to aspects of such reactions. Webster, U.S. Pat. No. 3,216,839 is directed to replacement of phenolic components in the production of methylolated resole resins.

One problem that is not addressed to any significant extent by such workers in the art is the extreme difficulty met in providing high solids, liquid lignin solutions. For many of the applications in which it is desired to replace or extend phenols with lignin products, manufacturers require such lignin solutions which are not readily available. This requirement has several aspects. Many resin manufacturers are not equipped to handle powders and therefore require lignin product in liquid form. Additionally, in the production of certain P/F resins, during the condensation of phenol and formaldehyde, typically 1.0 part of water is generated by every 3 parts of formaldehyde in the condensing mixture so that it is necessary to employ low viscosity lignin solutions having high solids content i.e., of the order of at least 40% solids, to avoid introducing excessive amounts of water into the system.

The problem of the lignin supplier in meeting these requirements resides in the solubility characteristics of lignin as well as in the characteristics of lignin solutions. For example, lignin and lignin products derived from alkaline wood pulping black liquors are damp granules, not liquids, at 40% to 50% or higher solids and are usually dried to give powders. Such damp granules or powders are insoluble in water but may be dispersed in water with alkali to make solutions containing up to about 35% lignin and less than 40% solids. At higher concentrations of lignin or at higher solids, such alkali-water solutions become too viscous to handle. Additionally, it requires at least about 10% sodium hydroxide, based on the weight of the lignin, to make such solutions. Although this 10% sodium hydroxide on lignin level is less than the total amount of sodium hydroxide used as a catalyst in the phenol/formaldehyde condensation, some resin producers prefer to start the condensation reaction with little or no alkali and to add the necessary alkali incrementally to control the condensation. For these users, the 10% sodium hydroxide on lignin level will render sodium hydroxide-lignin solutions in water unfit for their requirements.

Hochwalt et al U.S. Pat. Nos. 2,168,160 and 2,282,518 describe solutions of lignin in phenol. The solutions are prepared by heating the lignin on a steam bath in the presence of phenol with stirring. Air dried lignin and lignin in its wet condition as originally obtained are disclosed to be soluble. Satisfactory results are said to be obtained in accordance with the processes described when the lignin contains approximately 80% by weight of water. No upper limit on solids content is mentioned other than what would be encompassed in "air-dried lignin". This term, however, encompasses materials having solids content varied over a considerable range depending on the material that is being air dried, the method and conditions of the air drying and the duration of the air drying. In any event, patentee makes no distinction between the solubility characteristics of lignins at various solids content.

To the contrary, we have found that the solubility of lignin is related to a number of factors including the lignin source, the history of the black liquor from which it is derived, and the amount of lignin solids put in solution. For example, lignin from aged and oxidized black liquor is more difficult to dissolve and keep in solution than lignin obtained from fresh black liquor. We have found that solution stability problems may be encountered with solutions having solids content within the range below about 75% solids resulting in unstable solutions that separate into two phases. Moreover, the nature of the instability has been found to be different with solutions having solids content below about 40-45% lignin solids when compared to solutions having solids content above about 40-45% lignin solids. For example, with solutions of lignin from aged black liquor with a solids content below about 40-45%, such as the 20% lignin solids of the Hochwalt et al patents, the solutions separate into two phases so rapidly that the mixtures cannot be stored and dispensed as a uniform composition and therefore have no commercial value. With solutions of lignin from aged black liquor in the 40-75% lignin solids range, some lignins are readily soluble and stay in solution for extended periods without any separation while other lignins form unstable solutions that separate into phases. The unstable solutions encountered in this solids range, however, separate so slowly that the mixtures can be transported and used without problem.

Additionally, low solids materials are not suitable for replacing phenol at the desired 20-50%, or higher, replacement level. For example, for the desired replacement level, solutions containing less than about 40-45% solids cannot be used in reactions designed to produce 35-45% P/F resins due to the water that is generated during the reaction. The resulting resins cannot be concentrated by evaporating water because additional heating advances the resins beyond the desired stage of cure. Therefore, solutions containing only 20% lignin solids would introduce too much water into the system for some producers of P/F resins.

Webster, U.S. Pat. No. 3,216,839 provides solutions of lignin designed for use in forming laminating resins of the A-stage resole type by dissolving lignin in methanol, ethanol or isopropanol containing not more than 10% by weight of water when methanol is the solvent; not more than 30% water with ethanol; and not more than 20-35% water with isopropanol. Since very little water can be tolerated in these systems, the lignin must be dried. Additionally and significantly, the alcohols employed are not components for the P/F condensation reaction.

SUMMARY OF THE INVENTION

This invention relates to lignin concentrate solutions, to methods of making such solutions and to phenol-lignin-formaldehyde (PLF) resins produced therefrom. It has been discovered that normally water-insoluble, phenol-insoluble alkali lignin may be dissolved in phenol in the presence of water, that higher amounts of lignin may be brought into solution and that there is obtained a desired yet unexpected increase in total solids unaccompanied by undesirable increases in viscosity beyond workable levels.

More particularly, the invention relates to high solids, low viscosity solutions of lignin comprising at least 40% total solids employing phenol-water or phenol-water-sodium hydroxide or ammonia as the solvent media. The high solids solutions have viscosities below about 10,000 cps. at 25° C. and they are convertible to viscosities substantially below 10,000 cps. upon warming to temperatures up to about 50° C. The solution components are each components that may be used directly in a phenol-formaldehyde condensation reaction and solution is accomplished without heating.

Lignin or alkali lignin referred to herein is that produced as a by-product of alkaline pulping using either the soda process or the sulphate process and recovered from black liquor by acid precipitation, using either sulfuric acid or carbon dioxide, at a pH of about 8.0 to 9.0 and wherein the precipitated lignins are agglomerated, preferably by heating after precipitation, after which the agglomerated particles are cooled, filtered and washed, preferably to have an ash content of from about 8 to 14% or lower, if desired.

To illustrate the problem to which the present invention is directed, alkali lignin recovered from spent sulfate black liquor produced in pulping Douglas fir wood chips, was obtained by acidifying such black liquor with concentrated sulfuric acid to pH 8.7 after which the precipitated lignin was agglomerated by heating, the slurry was cooled and a filterable lignin cake was obtained and washed with water to yield a 47% solids filter cake which was dried at room temperature to 68.2% solids. This base material was used to prepare lignin solutions by admixture of (1) lignin and sodium hydroxide in water, hereafter referred to as SOLUTION A; (2) lignin and phenol in water, hereafter referred to as SOLUTION B; and (3) lignin and sodium hydroxide or ammonia and phenol in water, hereafter referred to as SOLUTION C.

Viscosity studies were made at 25° C. on solutions that had been left standing at room temperature for one week and the results were tabulated and plotted in graphical form. For purposes of comparison, the lignin concentration required to make a 10,000 cps. solution was also determined. 10,000 cps. at 25° C. is believed to be the highest viscosity that is tolerable in commercial applications and indicates the maximum lignin concentration achievable in any system for the present purposes since viscosity is dependent on the lignin content. Such lignin concentration correlated to 10,000 cps. or less at 25° C. is utilized herein as an index against which operable solutions are measured.

DETAILED DESCRIPTION OF THE DRAWINGS

Figure 2:
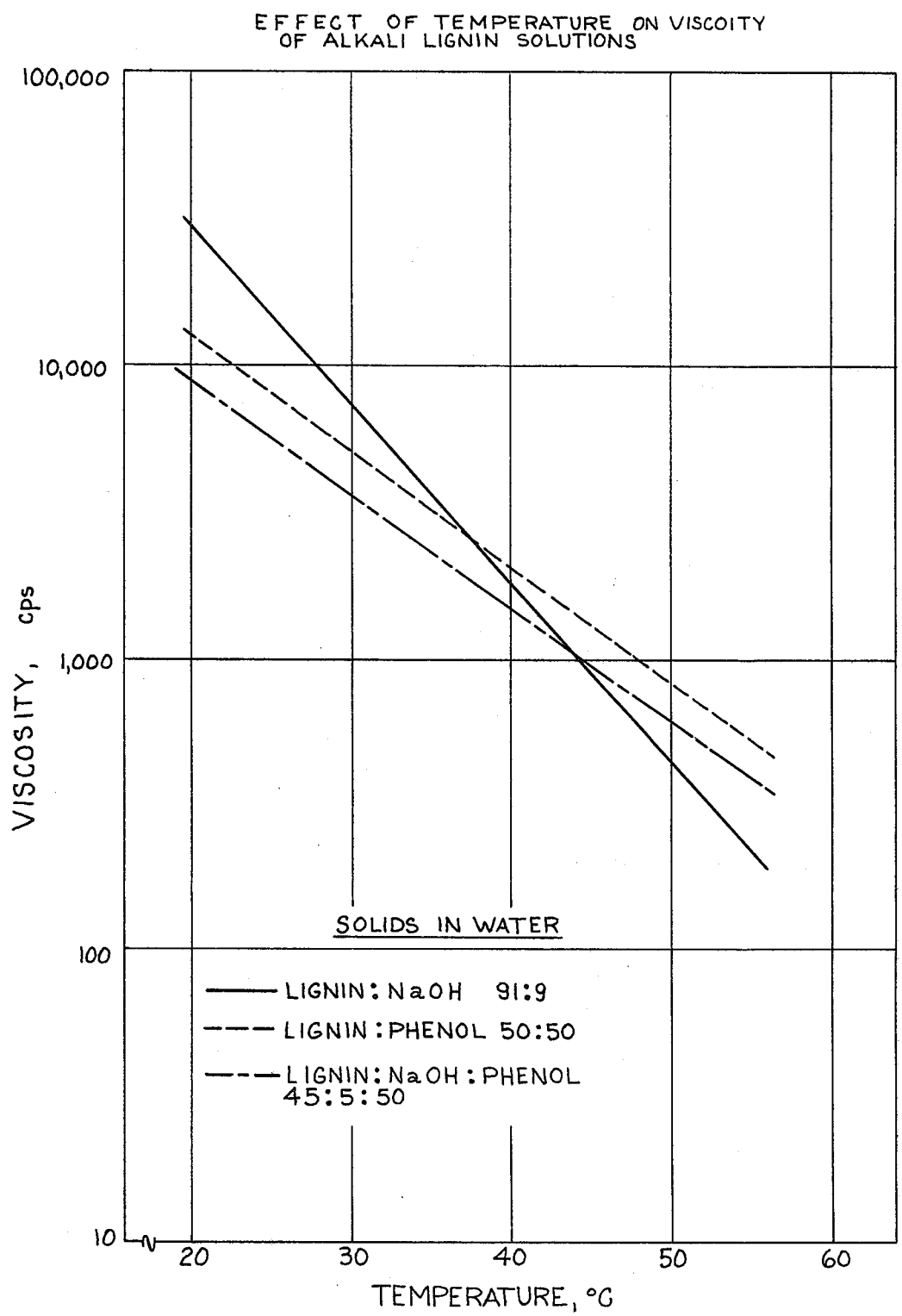
FIG. 2 is a graph illustrating the effect of temperature on the viscosity of SOLUTIONS A, B and C.

FIG. 2 illustrates that SOLUTIONS A, B and C having concentrations of 10,000 cps. at 25° C., can be lowered to more workable viscosities of 1,000 cps. or less when either of the solutions are warmed.

Figure 1:
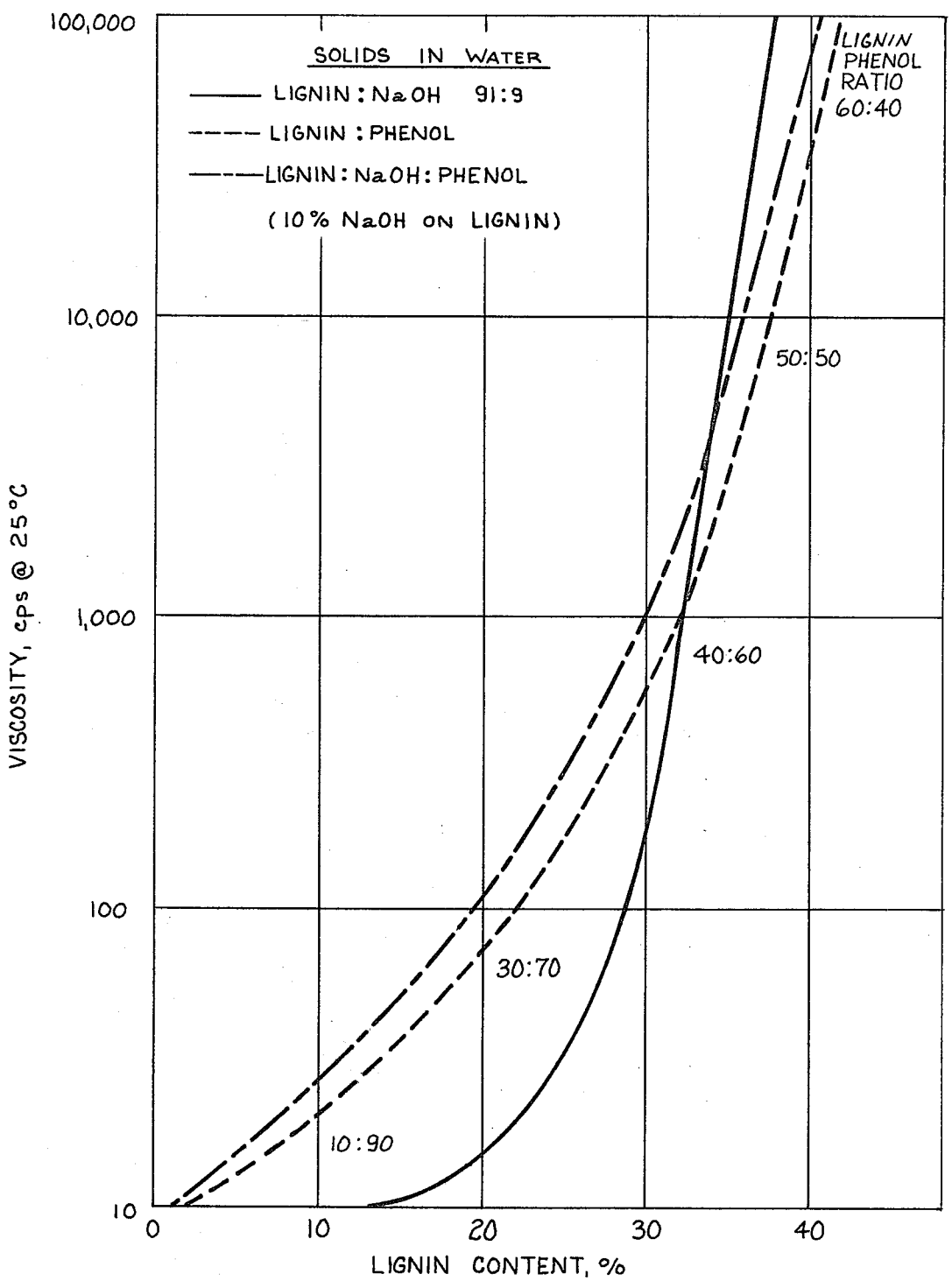
FIG. 1 is a graph illustrating the effect of lignin concentration on the viscosity of SOLUTIONS A, B and C.
Figure 3:
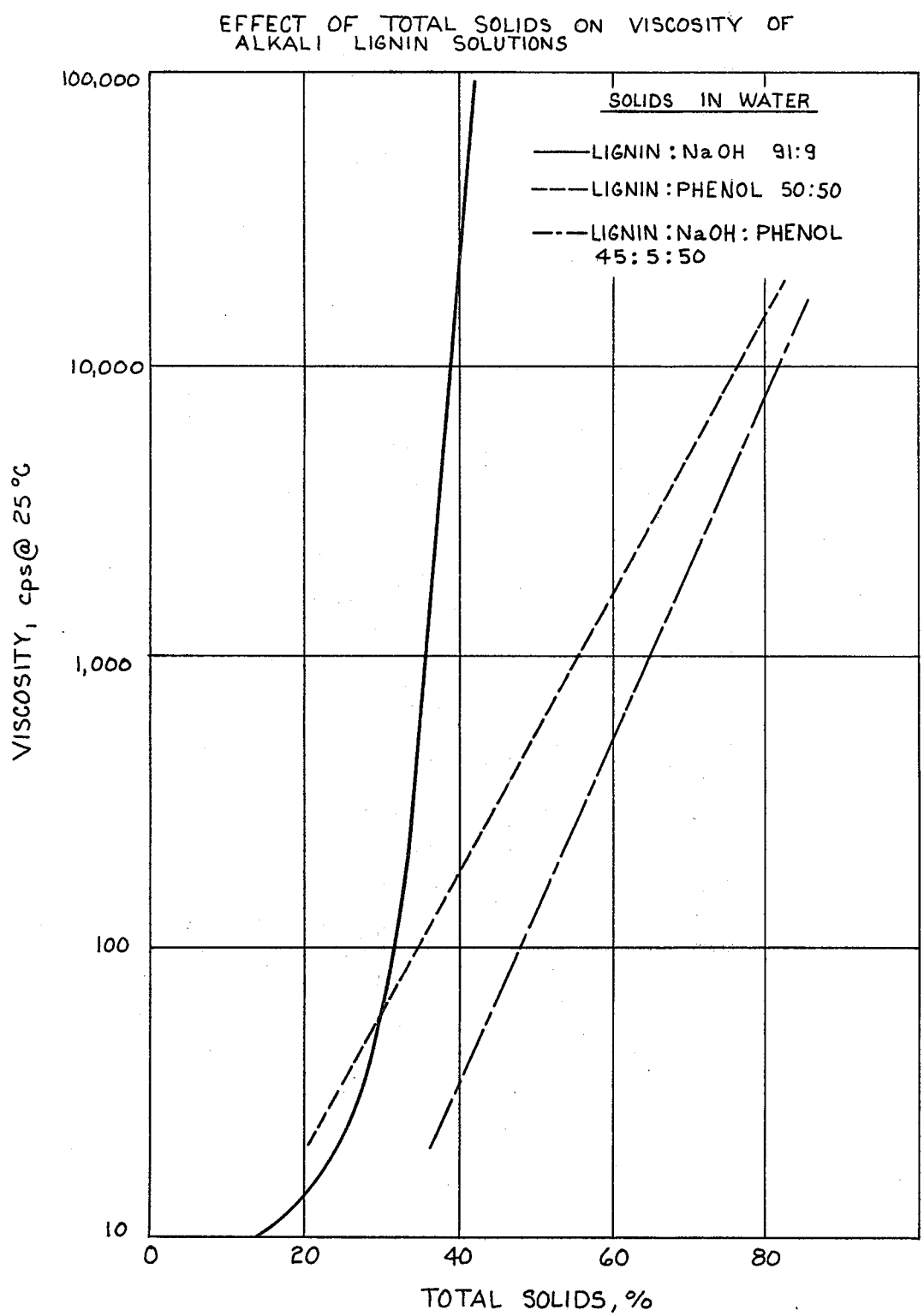
FIG. 3 is a graph illustrating the effect of total solids on the viscosity of SOLUTIONS A, B and C.

With reference to the graphs of FIG. 1 and 3, the following experiments were undertaken with respect to the solutions A, B and C.

SOLUTION A—LIGNIN-SODIUM HYDROXIDE-WATER

A systematic study of the viscosity of lignin solutions at 10% sodium hydroxide, based on the weight of lignin, was made and the results reported in Table I which follows:

TABLE I

| VISCOSITY OF ALKALI LIGNIN IN NaOH SOLUTIONS | | |
|---|---|---|
| Solids Content, % | | Viscosity of 91 parts Lignin - 9 |
| Total | Lignin | parts NaOH in water, cps @ 25° C. |
| 38.5 | 35.0 | 8200 |
| 35.2 | 32.0 | 1000 |
| 33.0 | 30.0 | 162 |
| 27.5 | 25.0 | 28 |
| 22.0 | 20.0 | 15 |
| 16.5 | 15.0 | 11 |
| 11.0 | 10.0 | 8 |

A consideration of the data of Table I together with that of FIGS. 1 and 3 illustrates that the maximum amount of lignin in solutions of viscosities of 10,000 cps. or less obtainable with sodium hydroxide-water solvents is about 35% lignin and less than about 40% total solids. It was found that adding additional sodium hydroxide did not increase the amount of lignin that could be brought into solution.

B. LIGNIN—PHENOL-WATER SOLUTIONS

We have found that the alkali lignate recovered from black liquor as herein employed, is not soluble in phenol when oven dried. The presence of water is necessary to obtain solution and as little as 5% water, either added to a mixture of 90 parts phenol and 10 parts alkali lignin or present in the phenol or lignin, brings about solution of lignin in phenol. When sufficient water is present dissolution may be accomplished without heat. The results of a study of lignin-phenol-water solutions are listed in Table II.

TABLE II

| VISCOSITY OF ALKALI LIGNIN IN PHENOL-WATER SOLUTIONS | | | | | |
|---|---|---|---|---|---|
| Solids Content, % | | Viscosity of Lignin:Phenol in Water, cps @ 25° C. | | | |
| Total | Lignin | 30:70 | 40:60 | 50:50 | 60:40 |
| 82.1 | 24.6 | 210 | — | — | — |
| 80.3 | 24.1 | 175 | — | — | — |
| 79.8 | 31.9 | — | 1,200 | — | — |
| 78.4 | 23.5 | 155 | — | — | — |
| 77.7 | 31.5 | — | 900 | — | — |
| 76.6 | 38.8 | — | — | 11,300 | — |
| 76.6 | 22.8 | 140 | — | — | — |
| 75.6 | 37.8 | — | — | 8,000 | — |
| 75.6* | 30.2 | — | 740 | — | — |
| 74.6* | 22.5 | 130 | — | — | — |
| 73.5 | 36.8 | — | — | 7,300 | — |
| 73.5* | 29.4 | — | 630 | — | — |
| 71.4* | 35.7 | — | — | 4,000 | — |
| 70.9* | 28.4 | — | 550 | — | — |
| 69.5* | 41.7 | — | — | — | 109,000 |
| 69.4* | 34.7 | — | — | 4,300 | — |
| 67.5* | 40.5 | — | — | — | 80,000 |
| 67.4* | 33.7 | — | — | 4,000 | — |
| 65.6* | 39.4 | — | — | — | 41,000 |
| 64.1* | 38.5 | — | — | — | 47,000 |

*Unstable solutions separate into two phases on standing.

These results, also plotted in FIGS. 1 and 3, illustrate again that lignin content has a profound effect on increasing viscosity when the lignin concentration is above the 30% lignin level. The shape and position of curves in FIG. 1 show that phenol-water mixtures are different than sodium hydroxide-water mixtures for dissolving lignin. The higher viscosities for lignin-phenol-water mixtures at lignin concentrations below about 32% indicate that lignin macromolecules are swollen to a higher degree by phenol than they are by sodium hydroxide. The steeper curve for lignin-sodium hydroxide-water above about 32% lignin indicates that particles interact to prevent bringing more lignin into solution. The phenol-water solvents continue to dissolve more lignin. At the 10,000-cps rating level the phenol-water system dissolves 37.6% lignin as compared to 35% lignin for sodium hydroxide-water.

The most surprising discovery about the lignin-phenol-water system is that total solids, including phenol, are well above the desired 60% level. See FIG. 3. At 10,000 cps, total solids are about 75% in the phenol-water system as compared to about 38.5% solids in sodium hydroxide-water.

C. LIGNIN-PHENOL-SODIUM HYDROXIDE-WATER SOLUTION

As may be seen from the data in Table II, it was found for some lignins that when the total solids concentration was below about 75%, the phenol-water solutions were unstable and separated into two phases on standing. Although not shown in the Table, it was additionally found that with some lignins, total solids could be reduced to 40% without experiencing separation problems. Where phase separation did occur, it occurred so slowly that the mixtures could be transported and used without problems. It was found that the two phases were readily recombinable upon stirring. It was also found that more stable mixtures which did not separate at all could be prepared by adding from 2 to 20% alkali based on the lignin in the mixtures. Results from a study wherein a part of the lignin was replaced with sodium hydroxide are listed in Table III.

TABLE III

| VISCOSITY OF ALKALI LIGNIN IN NaOH - PHENOL SOLUTIONS | | | | | |
|---|---|---|---|---|---|
| Solids Content, % | | Viscosity of Lignin: Lignin:NaOH:Phenol in Water, cps @ 25° C. | | | |
| Total | Lignin | 27:3:70 | 36:4:60 | 45:5:50 | 55:5:40 |
| 81.0 | 21.9 | 190 | — | — | — |
| 78.4 | 28.2 | — | 770 | — | — |
| 78.2 | 21.1 | 150 | — | — | — |
| 76.0 | 34.3 | — | — | 4,400 | — |
| 75.3 | 27.1 | — | 530 | — | — |
| 74.6 | 20.2 | 115 | — | — | — |
| 73.7 | 39.9 | — | — | — | 56,000 |
| 73.2 | 32.9 | — | — | 2,650 | — |
| 71.1 | 38.4 | — | — | — | 24,000 |
| 70.6 | 25.4 | — | 320 | — | — |
| 69.0 | 31.1 | — | — | 1,900 | — |
| 67.1 | 36.4 | — | — | — | 16,500 |
| 67.0 | 30.1 | — | — | 1,100 | — |
| 63.8 | 34.5 | — | — | — | 9,250 |

None of the above mixtures separated on standing. The plot of viscosity versus lignin content of such mixtures in FIG. 1 showed no improvement over lignin-phenol-water solutions in lignin dissolving power. However, total solids at 10,000 cps. were up from 75% to 80%. (FIG. 3).

When the experiment was repeated replacing phenol instead of lignin, at the 10,000 cps. level, the system contained 35.6% lignin and 71% total solids and did not separate on standing.

Ammonia may be substituted for sodium hydroxide in the lignin-NaOH-phenol-water mixtures. Such material permits slightly more lignin to be brought into solution than with sodium hydroxide. However, no improvement over the maximum lignin content of the phenol-water solvent is obtained.

Data in Table IV which follows may be compared to summarize the results reported above with regard to SOLUTIONS A, B and C.

TABLE IV

| Components in Water | Lignin in 10,000 cps. Solution, % (a) | Total Solids, % |
|---|---|---|
| SOLUTION A | | |
| 91 parts lignin | 35.0 | 38.5 |
| 9 parts NaOH | | |
| SOLUTION B | | |
| 50 parts lignin | 37.6 | 75 |
| 50 parts phenol | | |
| SOLUTION C | | |
| (1) 50 parts lignin | | |
| 5 parts NaOH | 35.6 | 71 |
| 45 parts phenol | | |
| (2) 45 parts lignin | | |
| 5 parts NaOH | 36.2 | 80 |
| 50 parts phenol | | |
| (3) 45.5 parts lignin | | |
| 9 parts NH$_3$ | 36.8 | 73.5 |
| 45.5 parts phenol | | |

(a) Viscosity measured with Brookfield viscometer 20 rpm and 25° C.

In the results discussed above, viscosity was measured with a Brookfield viscometer at 25° C. unless otherwise indicated. Solids content was determined by Xylene-Distillation Method wherein water is removed from a solution sample by refluxing with xylene and collecting the water in a graduated trap. Normal drying conditions are not employed to determine solids content since phenol slowly evaporates under such conditions. Solids content are determined by the equation $$S = [100(A - B)]/A$$

where S is the solids content of the sample, in % by weight; A is the weight of the sample in grams; and B is the volume of water collected, in milliliters.

The data set forth and discussed above indicate that aqueous sodium hydroxide is a suitable solvent for provision of lignin solutions when such solutions are to be used in applications not requiring more than 40% total solids. However, where higher solids solutions are desired or necessary, phenol-water mixtures or such mixtures containing from about 2 to 20% sodium hydroxide or ammonia based on lignin are superior. Additionally in each of SOLUTIONS B and C, all of the solids components are those needed to make the desired PLF resins rendering the same suitable for use in such reactions as phenol extenders without treatment subsequent to shipment and storage except that where such phenol-water mixtures separate into phases, it may be necessary to stir them to recombine the phases or it may be necessary to add a minimal amount of sodium hydroxide to prevent phase separation.

The invention contemplates lignin-phenol-water concentrate solution containing at least 40% solids and viscosities not higher than 10,000 cps. at 25° C. wherein the lignin to phenol ratios, by weight, are less than 70:30 and more than 40:60 as well as such solutions wherein from about 2 to 20% by weight of lignin is replaced with sodium hydroxide or ammonia.

Preferred solutions will contain at least about 32% to 35% by weight of lignin in a lignin to phenol ratio of 50:50, will have a solids content of about 60 to 70% and will be stable on storage and during shipment under normal conditions of temperature and pressure, i.e., room temperature and atmospheric pressure. An especially preferred solution comprises about 32% lignin, 32% phenol and about 36% water.

Water necessary for solution may be present in the damp lignin cake initially dissolved or it may be added to the phenol or to the lignin which may initially be in powdered form.

Such preferred compositions will be derived by dissolving lignin filter cake containing about 45 to 50% solids in phenol.

The compositions may be supplied, stored and shipped in bulk and used to produce PLF resins by mixing phenol, formaldehyde and catalyst or by merely mixing with formaldehyde depending on the amount of phenol and catalyst present in the lignin concentrate.

The invention may be better understood from the following examples:

EXAMPLE 1

910 kg. of black liquor generated by pulping Douglas fir wood chips by the sulfate process and containing 35% solids was acidified with concentrated sulphuric acid to pH 8.1 and the precipitated lignin agglomerated by heating. The agglomerated lignin was cooled, filtered and washed with water to produce 195 kg. of lignin cake that contained 49.2% solids. The solids contained 8.2% ash.

To make a solution, 3.2 kg. of 90% phenol was poured into a 10-liter steel tank. While mixing vigorously with an electrically driven stirrer, 5.9 kg. of 49.2% solids filter cake was slowly added. Mixing was continued until the lignin was dissolved, then the solution was filtered through a 30-mesh screen to remove suspended solids. The solution had a viscosity of 2,950 cps. at 25° C. and contained 68.2% solids as measured by the Xylene-Distillation method. Ash content of the solution, as measured by American Can Company Method Analytical Procedure 5.51, was 2.8%. In this analytical method, ash content is defined as the residue remaining after ignition of a sample at 800° C. until all carbon is burned off. The procedure involves firing an aliquot sample at 800° C. for 20 minutes. Ash content is calculated according to the equation:

$$A = [C(100)]/B$$

where A is the ash content of the sample, %; B is the weight of the sample before firing, g.; and C is the weight of the ash residue, g.

The suitability of the high solids concentrate for replacement of phenol in the production of P/F resins was determined as follows: A 1-liter, 3-necked round bottom flask equipped with an electric stirrer, thermometer, reflux condenser and heating mantle was used for preparing all resins. 55.5 g. of 90% phenol, 73.5 g. of 68.2% lignin-phenol solution, 173 g. of 37% formaldehyde, 25.5 g. of 50% sodium hydroxide and 93.5 g. of water were added to the flask and heated to reflux over a period of 10 minutes. 60 ml. of water were distilled off over a 15-20 minute period. When the water was removed, the distillation condenser was replaced with a reflux condenser and heating was continued until the total boiling period was 25 minutes. The mixture was cooled to 90° C. after which 30 g. of 50% sodium hydroxide was added and reacted at 90° C. for 30 minutes. While cooling to 85° C., 15 g. of 50% sodium hydroxide was added and reacted at 85° C. for 30 minutes followed by cooling to 25° C. At this point the viscosity was 170 cps. After reacting at 85° C. for an additional 30 minutes, the viscosity at 25° C. increased to 240 cps. Another 30 minutes at 85° C. gave a solution with a desired viscosity of 385 cps. The resin pH was 13.5 and total solids as measured by oven drying at 105° C. was 43%. The mole ratio for phenolic:formaldehyde:sodium hydroxide for this phenol-lignin-formaldehyde (PLF) resin was 1:2:0.82.

A control resin containing no lignin was made by mixing 111 g. of 90% phenol, 129.5 g. of 37% formaldehyde, 5.22 g. of 50% sodium hydroxide and 119 g. of water in the 1-liter reaction flask. The mixture was slowly heated to relux over a period of 90 minutes and refluxed for 70 minutes. After cooling to 70° C., 12 g. of 50% sodium hydroxide was added before reacting at 80° C. for one (1) hour. A third portion of 8.0 g. of sodium hydroxide was added and the mixture was reacted at 85° C. for one (1) hour. Upon cooling to 25° C., the solution had a viscosity of 130 cps.

Reacting an additional 30 minutes at 85° C. gave a 25° C.-viscosity of 220 cps. Thirty (30) more minutes of reacting at 85° C. gave a desired 600 cps. reading at 25° C. The solids content of this control resin was 39.2%.

The control phenol-formaldehyde (PF) and the phenol-lignin-formaldehyde resin (PLF) were compounded into plywood glues by incorporating fillers, a defoaming agent, sodium hydroxide and water employing methods well known in the art. Batches of 396.5 gm. total weight were prepared in a 600-ml. beaker using a mixer with a rheostat speed control. Glues with viscosities of 5100 and 2700 cps, respectively, were obtained.

Adhesive quality was tested by gluing 17.8×25.4 cm., 3-ply panels of Douglas fir veneers cut 3.2 mm. thick. Weighed amounts of glue were applied to both sides of the center ply. Wood coated with glue was sandwiched between two outer, face plies so that the grain of the center ply ran at right angles to the grain of the face plies. Before gluing, all veneers were dried a minimum of 24 hours at 63° C. in a forced-draft oven.

The center ply veneer was weighed and glue poured on one side to get the desired weight which is one-half the amount for applying 56-pounds per thousand square feet of double glue line (MDGL). The glue was spread with a small paste brush as quickly as possible. The veneer was re-weighed and minor adjustments made to bring the glue applied to the correct weight. A face ply of veneer was placed over the coated surface and the assembly was inverted on a scale to apply glue to the other side of the center ply. The second face ply was then placed on the assembly. The process took from 4–6 minutes.

Stand time was measured from the time the panel was completely assembled until it was put into the press. During this period a 25×38-cm. metal pan weighing 400 gm. was put on the panels to keep the plies from separating. Hot pressing 6 minutes at 175 psi. was done in a Wabash press with 17.8×25.4-cm. platens electrically heated to 285° F. After cooling, samples were sawed, kerfed, soaked and pulled apart under shear stress according to methods outlined in National Bureau of Standard (NBS) Voluntary Products Standard PS 1-74. Wood failure values were obtained by examining sheared surfaces after drying. Values above 85% are acceptable. Higher values indicate better bonding.

Test results of 91% wood failure for the PF resin and 92% for the PLF resin indicate that dissolved alkali lignin added to phenol at a 25% replacement level produces a high quality glue.

EXAMPLE 2

A 50% solids lignin filter cake from black liquor generated from pulping Douglas fir wood chips by the sulfate process was recovered by the process described in Example 1. A 64.2% solids solution of lignin in a phenol-water mixture was made by dissolving 300 g. of 50% lignin in 167 g. of 90% phenol.

Resin with a 1:1.5:0.3 mole ratio of phenolic:formaldehyde:sodium hydroxide was prepared by mixing the following ingredients in a 1-liter, 3-necked reaction flask:

90% phenol: 55.5 gm
64.2% lignin-phenol solution: 78.0
37% formaldehyde: 129.5
50% sodium hydroxide: 5.2
Water: 96.5

The mixture was slowly heated to reflux at 95° C. over a 90 minute period. Refluxing was continued for 50 minutes and quickly cooled to room temperature. After adding 12 gm. of 50% sodium hydroxide, the solution was heated to 80° C. and reacted for 60 minutes. An additional 8 gm. of 50% sodium hydroxide was added and the solution reacted at 80° C. for 15 minutes. When cooled to 25° C. the viscosity was 290 cps. Reacting at 80° C. for an additional 20 minutes brought the viscosity at 25° C. up to a desired level of 650 cps. The final resin solids was 38%.

Glue was prepared as indicated in Example 1 to make 3-ply panels of Douglas fir. Panel specimens were exposed to vacuum-pressure while submerged in water and tested according to NBS Voluntary Product Standard PS 1-74. A 91% wood failure result indicated good wood bonding for glue made from the PLF resin.

EXAMPLE 3

A 47% solids lignin filter cake from black liquor generated from pulping Douglas fir wood chips by the sulfate process was recovered as in Example 1. Solids in the cake were increased by air drying 167 kg. to a solids content of 56.8%. A 265-liter tank equipped with an electrical mixer was used to dissolve the 56.8% solids lignin in 87.5 kg. of 90% phenol. Final solids of the solution was 70.3%. The ash content was 3.9%.

Resin with a 1:1.5:0.3 mole ratio of phenolic:formaldehyde:sodium hydroxide was prepared by mixing the following ingredients in a 1-liter, 3-necked reaction flask:

90% phenol: 55.5 gm.
70.3% lignin-phenol solution: 71.0
37% formaldehyde: 129.5
50% sodium hydroxide: 5.2
Water: 103.5

The mixture was heated slowly at an even rate to reflux at 95° C. over a 90 minute period. Refluxing was continued for 70 minutes. After cooling to room temperature, 12.0 gm. of 50% sodium hydroxide was added. The solution was refluxed for 20 minutes, cooled to 80° C. and reacted at this temperature for 30 minutes. When cooled to 25° C. the viscosity was 170 cps. Reacting an additional 30 minutes at 80° C. gave a viscosity of 680 cps. at 25° C. Adding 8.0 gm of sodium hydroxide and reacting 15 minutes at 80° C. gave a viscosity of 460 cps. at 25° C. The resin contained 37.2% solids.

Glue was prepared as indicated in Example 1 to make 3-ply panels of Douglas fir. Panel specimens were exposed to vacuum-pressure while submerged in water and tested according to Method PS 1-74. A 96% wood failure result indicated excellent wood bonding for glue made from the PLF resin.

EXAMPLE 4

A 54.1% solids lignin filter cake from black liquor generated from pulping Southern pine wood chips by the sulfate process was recovered as described in Example 1. Dilute black liquor at 16% solids was concentrated by evaporation to 25% solids. After skimming off tall oil soap this liquor was blended with 50% solids black liquor to make a 35% solids feed liquor for the lignin recovery process.

A 3.8-liter stainless steel blender bowl was used to mix 1,092 gm. of 90% phenol and 1,817 gm. of 54.1% solids Southern pine lignin. The solution contained 71.4% solids. Water and 65 gm. of 50% sodium hydroxide were added to adjust final solids to 65.2%. The pH of the mixture was 9.5, viscosity was 2000 cps. at 25° C. and ash content was 5.7%.

Resin with a 1:1.5:0.3 mole ratio of phenolic:formaldehyde:sodium hydroxide was prepared by mixing the following ingredients in a 1-liter, 3-necked reaction flask:

90% phenol: 55.5 gm
65.2% lignin-phenol-NaOH solution: 77.0
37% formaldehyde: 129.5
50% sodium hydroxide: 5.2
Water: 97.5

The mixture was slowly heated to reflux and refluxed for 70 minutes. After cooling to room temperature, 12 gm. of 50% sodium hydroxide was added. Refluxing was continued for 20 minutes and when cooled to 25° C. the viscosity was 70 cps. Reacting at 80° C. for 60 minutes gave a viscosity of 830 cps. at 25° C. After adding 8 gm. of 50% sodium hydroxide, the mixture was reacted 5 minutes at 80° C. and cooled to get a viscosity of 330 cps. Reacting 7 minutes longer at 80° C. gave the desired viscosity of 460 cps. at 25° C. Final solids were 38.8% and the pH was 11.0.

Glue was prepared as indicated in Example 1 to make 3-ply panels of Douglas fir. Panel specimens were exposed to vacuum-pressure while submerged in water and tested according to Method PS 1-74. A 96% wood failure result indicates excellent wood bonding for glue made from a resin in which 25% of the phenol was replaced with dissolved Southern pine lignin.

The glue preparations and results of testing of the PLF resins of the above examples are listed in Table V which follows:

TABLE V
PLYWOOD GLUING AND TEST RESULTS

| Example No. | Control | 1 | 2 | 3 | 4 |
|---|---|---|---|---|---|
| Resin - Type | PF | PLF | PLF | PLF | PLF |
| Solids, % | 39.2 | 43 | 38 | 37.2 | 38.8 |
| Glue Viscosity 25° C., cps. | 5,100 | 2,700 | 9,000 | 4,600 | 3,200 |
| Plywood Gluing: | | | | | |
| Resin Solids in Glue, % | 28 | 28 | 28 | 28 | 28 |
| Glue Applied, lbs./MDGL [1] | 56 | 56 | 53 | 56 | 56 |
| Stand Time, Minute | 30 | 18 | 60 | 60 | 60 |
| Press Temp., °F. | 285 | 285 | 285 | 285 | 285 |
| Pressure, psi. | 175 | 175 | 175 | 175 | 175 |
| Press Time, minutes | 6 | 6 | 6 | 6 | 6 |
| Plywood Test: | | | | | |
| Wood Failure After Vac-Press., % | 91 | 92 | 91 | 96 | 96 |

[1] MDGL = thousand square feet of double glue line.

It will be seen that the invention provides high solids, low viscosity lignin solutions that are capable of storage and shipment and suitable as replacements for phenol as reactants in the production of phenol-formaldehyde type resins which are useful in plywood manufacture.

We claim:

1. A lignin concentrate solution having in excess of about 40% total solids and a viscosity not higher than 10,000 cps. at 25° C. consisting essentially of normally water-insoluble and phenol-insoluble alkali lignin derived from black liquor and dissolved in a solvent selected from the group consisting of (a) phenol and water and (b) phenol, water and sodium hydroxide or ammonia; the lignin to phenol weight ratio in said solutions being less than 70:30 and more than 40:60 and said sodium hydroxide or ammonia being present in amounts of 2 to 20% based on the weight of lignin or phenol in the solution.

2. A lignin concentrate solution as claimed in claim 1 having about 40% to 80% total solids and containing lignin dissolved in phenol, water and sodium hydroxide.

3. A lignin concentrate solution as claimed in claim 1 having about 60% to 70% total solids and containing lignin dissolved in phenol, water and ammonia.

4. A lignin concentrate solution as claimed in claim 1 having about 60% to 70% total solids and containing lignin dissolved in phenol and water.

5. A lignin concentrate solution having a total solids content of about 65%, a viscosity not higher than 10,000 cps. at 25° C. and consisting essentially of about 32% to about 36% normally water-insoluble and phenol-insoluble alkali lignin derived from black liquor and dissolved in about 32% to about 36% phenol and about 30% to about 36% water.

6. A method for dissolving normally water-insoluble and phenol-insoluble alkali lignin derived from black liquor in a solvent to produce a lignin concentrate solution comprising in excess of about 40% total solids and having a viscosity not higher than 10,000 cps. at a temperature of 25° C. consisting of the steps of
(1) admixing lignin comprising at least 45% solids with phenol in the presence of at least 5% by weight of water, at a lignin to phenol weight ratio of not more than 70:30 and not less than 40:60 and
(2) subjecting said mixture to agitation to dissolve the lignin.

7. A method as claimed in claim 6 in which from about 2 to 20% of sodium hydroxide or ammonia, based on the weight of lignin is added to said lignin-phenol-water mixture.

8. A method as claimed in claim 6 in which a lignin concentrate comprising about 60% to 70% total solids is produced by admixture of wet lignin cake containing about 45% to 50% solids with phenol, the lignin to phenol ratio being about 50:50.

9. A method as claimed in claim 6 in which a lignin concentrate comprising about 70% to 80% total solids is produced by admixture of wet lignin cake, and phenol in a lignin to phenol ratio of 50:50 and 5 parts sodium hydroxide based on the lignin.

10. A method as claimed in claim 6 in which a lignin concentrate comprising about 74% total solids is produced by admixture of wet lignin cake and phenol in a lignin to phenol ratio of 50:50 and 9 parts ammonia based on the lignin.

11. A method as claimed in claim 6 in which a lignin concentrate comprising about 75% total solids in water is produced by admixture of 50 parts of wet lignin cake and 50 parts phenol.

12. A method for producing a phenol-lignin-formaldehyde resin comprising the steps of:
   forming a lignin concentrate solution in accordance with claim 1; and
   condensing phenol, formaldehyde and said lignin concentrate solution in the presence of an alkali catalyst.

13. A method as claimed in claim 12 wherein said phenol reactant is replaced by from about 25% to about 100% by the lignin concentrate solution of claim 1.

14. A method as claimed in claim 12 wherein the lignin concentrate solution has about 60% to 70% total solids and contains lignin dissolved in phenol and water, the lignin to phenol ratio being about 50:50.

15. A method as claimed in claim 12 wherein the lignin concentrate has about 74% solids and contains about 37% lignin dissolved in phenol, water and ammonia.

16. A method as claimed in claim 12 wherein the lignin concentrate solution has about 70% to 80% total solids and contains about 32% to 36% lignin dissolved in phenol, water and sodium hydroxide.

* * * * *